US004001641B2

United States Statutory Invention Registration [19]

[11] Reg. Number: H1641

Sharman

[45] Published: Apr. 1, 1997

[54] CONNECTION OF MOBILE DEVICES TO HETEROGENOUS NETWORKS

[75] Inventor: Duane R. Sharman, Calgary, Canada

[73] Assignee: GTE Mobile Communications Service Corporation, Atlanta, Ga.

[21] Appl. No.: 159,283

[22] Filed: Nov. 30, 1993

[51] Int. Cl.[6] ..... H04Q 7/22

[52] U.S. Cl. ..... 379/60; 379/58; 379/59; 379/63; 455/33.1; 455/53.1

[58] Field of Search ..... 379/58, 60, 63; 455/33.1, 33.4, 56.1, 66; 340/825.44; 370/85.7

[56] References Cited

U.S. PATENT DOCUMENTS

| | | | |
|---|---|---|---|
| 4,677,656 | 6/1987 | Burke et al. | 379/63 |
| 4,881,073 | 11/1989 | Andros et al. | 340/825.44 |
| 5,159,592 | 10/1992 | Perkins | 370/85.7 |
| 5,274,841 | 12/1993 | Natarajan et al. | 455/33.4 |
| 5,278,892 | 1/1994 | Bolliger et al. | 379/60 |
| 5,280,521 | 1/1994 | Itoh | 379/58 |
| 5,307,400 | 4/1994 | Sawyer et al. | 379/59 |

OTHER PUBLICATIONS

Weib, Wizgall, "System 900: The ISDN Approach to Cellular Mobile Radio", Electrical Communications, vol. 63, #4, 1989.

Goodman, "Trends in Cellular and Cordless Communications" IEEE Communications Magazine, Apr. 1991.

Telephony's Dictionary, 2nd Edition, Apr. 1986, p. 84.

*Primary Examiner*—Bernarr E. Gregory

*Attorney, Agent, or Firm*—Janet E. Witt; James M. Jordan, III

[57] ABSTRACT

An improved apparatus for connecting a mobile end system to a communications network includes a mobile end system with storage that is assigned a first unique identity code. An interface with a first transmitter is assigned a second unique identity code and is linked to the mobile end system via a first communications channel. A data switch with a second transmitter is assigned a third unique identity code, and is linked to the interface via a second communications channel. The data switch is also linked to the communications network via a third communications channel. The mobile end system transmits at least the first unique identity code to the interface, which transmits a least the first and second unique identity codes to the data switch, which in turn transmits at least the first, second and third unique identity codes to the communications network. A method of communicating data packets bidirectionally between two mobile end systems or between a mobile end system and a fixed end system through a communications network includes the steps of assigning unique identity codes to each mobile end system and to an interface device and a data witch for each mobile end system, setting up communication channels between the end systems, identifying the routing scheme to be used for the packet transmission, and establishing bidirectional communications between the end systems.

23 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONNECTION OF MOBILE DEVICES TO HETEROGENOUS NETWORKS

FIELD OF THE INVENTION

This invention relates generally to telecommunication networks, and more particularly to the communication of packet data and the connection of switched telephone circuits to and from mobile end systems. The mobile end systems may connect to switched circuit networks and packet data networks using various interface devices, including telephone circuits, cellular switched radio channels, cellular packet data radio channels, and local area network interfaces.

BACKGROUND OF THE INVENTION

Many telecommunication systems are available for connecting terminal equipment to switched circuit and packet data networks. Most provide communication services to terminals, or end systems that reside in a fixed location, connecting to a network at a topologically restricted point in order to facilitate static routing of packets or calls, for instance fixed telephone or local area networks. Mobility features have been designed into cellular equipment, to support connection of a mobile terminal or end system to a cellular basestation depending on the geographic area covered by the basestation and the radio path between the basestations and the mobile end system. Cellular systems have been designed to provide switched circuit communications, for cellular telephones as defined in TIA RS-553 specifications, and more recently in cellular packet data communications, as defined in the CDPD specifications.

Interworking requirements for fixed and cellular telephone equipment have been developed to provide uniform service, including a uniform numbering plan and compatible call setup procedures. The North American cellular industry has developed the RS-553, IS-54, and IS-41 specifications for switching systems to allow cellular telephones to roam between cellular switch systems, providing authentication, location tracking, call routing and setup, and handoff between cellular switch systems. Similar specifications have been developed for other cellular systems including European GSM.

Similarly, interworking requirements for fixed and cellular packet data systems have been developed to provide uniform service, with a uniform addressing plan and compatible packet transport procedures. Packet data networks may include equipment to facilitate the operation of interconnected subnetworks using different communications technologies. The Internet protocol stack for TCP/IP communications defines communications methods that permits different technologies such as Ethernet, X.25, satellite, and dialup circuits to interoperate. Packet data networks can include switched circuit data links using modems and asynchronous communications equipment with X.25 protocol capabilities, or asynchronous communication using the Internet SLIP or PPP protocols. The cellular industry has developed the CDPD specifications for cellular digital packet data communications to allow mobile end systems to roam between cellular packet data systems while providing effective packet data communication services.

A cellular telephone system provides circuit-switched radio communication between a stationary cellular switch system and one or more cellular telephones, and other equipment accessible through the switched telephone network. Circuit-switched radio communication is typically used to provide voice, facsimile, and data communication services. The cellular switch system typically includes equipment for interconnecting to the switched telephone network, a network of geographically separated circuit basestations, circuit-switching equipment for connecting the telephone network to the basestations, circuit control equipment, and other equipment over radio links, where a call is established between a mobile end system and a basestation. Such a cellular telephone system is described in the Bell System Technical Journal, January 1979, entitled, "The Cellular Concept," page 15, et seq.

Cellular switch systems provide mobile telephone service to cellular telephones in the geographic areas covered by the basestations. Cellular switch systems are interconnected by trunking facilities that provide circuit-switched communication paths between base systems, either directly or through the switched telephone network.

Cellular telephones are mobile, and may roam between geographic areas covered by circuit basestations that are part of different cellular switch systems. Intersystem signalling procedures following the IS-41 standards between cellular switch systems is supported by data communication networks that communicate information about the identity, location, and capabilities of roaming cellular telephones between the control equipment at different cellular switch systems. This information is used to provide circuit-switched communication between cellular telephones or cellular mobile end systems, without constraining such service to the geographic area covered by a single cellular switch system.

A cellular packet data system provides packet data radio communication between a stationary cellular packet data system and one or more cellular packet mobile end systems. Packet data radio communication provides data communication between fixed end systems and mobile end systems, or between mobile end systems and other mobile end systems. A cellular packet data system typically includes equipment for interconnecting to one or more packet data networks, a network of geographically separated packet basestations, packet switching equipment, and other equipment. A cellular packet data system uses one or more radio channels that are shared by several mobile end systems, for transmission of data in bursts between the mobile end systems and a basestation. Interconnection to fixed packet data networks may be provided over various suitable communication media.

Cellular packet mobile end systems are typically portable, and may roam between geographic areas covered by packet basestations that are part of different cellular packet data systems. Data communication between cellular packet data systems communicates information about the identity, location, and capabilities of roaming packet mobile end systems between data switches at different cellular packet data systems. This information is used to provide data communication to cellular packet mobile end systems, without constraining such service to the geographic area covered by a single cellular packet data system.

A cellular packet data system may operate independent of any cellular switch system, or may interconnect with the cellular telephone system to share common equipment or resources, e.g., radio channel assignment, antennae or telephone interface equipment. One method of interconnecting a cellular telephone system and a cellular packet data system is described in U.S. patent application Ser. No. 07/674,660, filed Mar. 25, 1991, now abandoned.

One weakness of the current cellular switch system and cellular packet data system technology is the inability to provide packet data coverage to mobile end systems outside of the area of coverage of the cellular packet data system. It is desired to use switched circuit cellular equipment to provide an alternate means of access to packet data networks, in areas not covered by cellular packet data systems, or to use fixed telephone circuits or local area network interfaces where neither cellular nor cellular packet coverage is available. Current switching equipment cannot offer solutions to these requirements.

A cellular remote unit may operate independent of any packet remote unit, or the two remotes may be integrated to share common equipment or resources. Typically, circuit-switched and packet mobile end systems are integrated, such that parts of the radio equipment are shared between circuit-switched and packet usage. A mobile end system will use a single radio channel to provide either switched circuit or packet communication, but cannot provide both simultaneously. When the radio channel is used for circuit-switched communication, packet communication services cannot be provided, and when the radio channel is used for packet communication, circuit-switched communication services cannot be provided. It is desired for a mobile end system to be able to receive switched circuit calls while monitoring a cellular packet data radio channel, and to transparently switch to switched circuit operation when an incoming call arrives, or when the use of switched circuit cellular equipment would provide superior performance or lower cost for the communications service. Current equipment cannot offer this service.

A variety of methods exist in prior art for providing reliable switched circuit data communication over cellular channels, as described in several U.S. Patents. These methods offer routing only within the context of the switched circuit network, including fixed and cellular subnetworks, and do not support interconnection of switched cellular data communication devices to packet data networks, or routing of packet data to mobile switched cellular data communications equipment. Reference is made in this regard to U.S. Pat. Nos. 5,159,592 granted to IBM and 4,837,800 granted to Motorola, Inc.

SUMMARY OF THE INVENTION

The invention resides in interconnecting a mobile end system to a communication network that includes a packet data network and may include a telephone network, using various interface devices to communicate packet data between the mobile end system and the packet data network, and to connect switched circuits between the mobile end system and the telephone network. Suitable interface devices may include a cellular telephone, a packet data cellular module, a telephone interface, and a local area network interface, among others.

Each mobile end system will be identified by an address within the packet data network, and optionally by an address within the telephone network. Packet switches will receive data packets from various communication links, and route these data packets to mobile end systems, to fixed end systems, to external network gateways, or mobile network support elements including mobile location registers and routers. Data packets will include the address of the mobile end system or fixed end system to which the data packet is to be delivered.

The mobile end system connects to an interface device to determine the location of the mobile end system. The mobile end system and interface device will communicate the location information to a mobile location register.

The mobile location register will store the most recent location information for mobile end systems, identifying the routing required for access to the connected interface device, and may additionally qualify the location of the mobile end system with respect to the point of interconnection. For example, location information for a mobile end system that is connected to a telephone interface would include the directory number of this interface.

The mobile location register will communicate current location information to tables maintained by routers, enabling the routing of data packets to an interface device, which then delivers the packets to the mobile end system.

Using this mobile packet communication system, additional features that support routing of switched-circuit calls to mobile end systems can be provided, and methods for connecting the switched circuit path are described. Specific methods for interworking of cellular switched circuit and cellular packet data networks are also described.

Several objects and advantages of preferred aspects of the invention include the following:

(a) provision of switched circuit service and packet data communication in a network composed of interconnected subnetworks, where the mobile end system can move between or select between various subnetworks, (b) communication of packet data between mobile end systems and fixed end systems, where the mobile end systems move between geographic areas covered by different subnetworks, which may include cellular packet data, cellular telephone, telephone circuits, and local area networks, (c) communication of packet data between mobile end systems and fixed end systems, where the mobile end system selects or may be cause to be selected one or more of the available subnetworks, (d) communication of packet data between mobile end systems and other mobile end systems, where the mobile end systems may move between or select the communication access means as described in (b) and (c), (e) establishment of switched circuit connections to mobile end systems, where the mobile end system in question may be communicate signalling information through cellular packet data, fixed telephone circuits, and local area networks, (f) routing of voice or other switched circuit telephone calls, dependent on the current location of a mobile end system, and (g) switching from a shared packet data radio to a switched circuit channel for higher performance or lower cost.

According to the present invention then, there is provided an apparatus for connecting a mobile end system to a communications network comprising a mobile end system incorporating storage means and having assigned thereto a first unique identity code, an interface device including a first transmission means and having assigned thereto a second unique identity code, said interface device being linked to said mobile end system via a first communications channel, and data switch means including a second transmission means and having assigned thereto a third unique identity code, said data switch means being linked to said interface device via a second communications channel and being additionally linked to said communications network via a third communications channel, wherein said mobile end system communicates with said interface device by transmitting at least said first unique identity code thereto and wherein said interface device communicates with said data switch by transmitting at least said first and second unique identity codes thereto and communicating said third unique identity code as well as said first and second unique identity codes to said communications network.

According to another aspect of the present invention, there is also provided a method of communicating data packets bidirectionally between a mobile end system and either a fixed end system or another similar mobile end system, said mobile end system being coupled to one or more subnetwork communication devices to communicate with a circuit switched network or packet data network, said method comprising the steps of assigning unique identity codes to at least said mobile end system, to an interface device and to a data switch means, setting up communication channels between an originating device and a terminating device, identifying the routing to be used for packet transmission, establishing bidirectional communications between an originating device and a terminating device.

DETAILED DESCRIPTION OF INVENTION

System Overview

Figure 1:
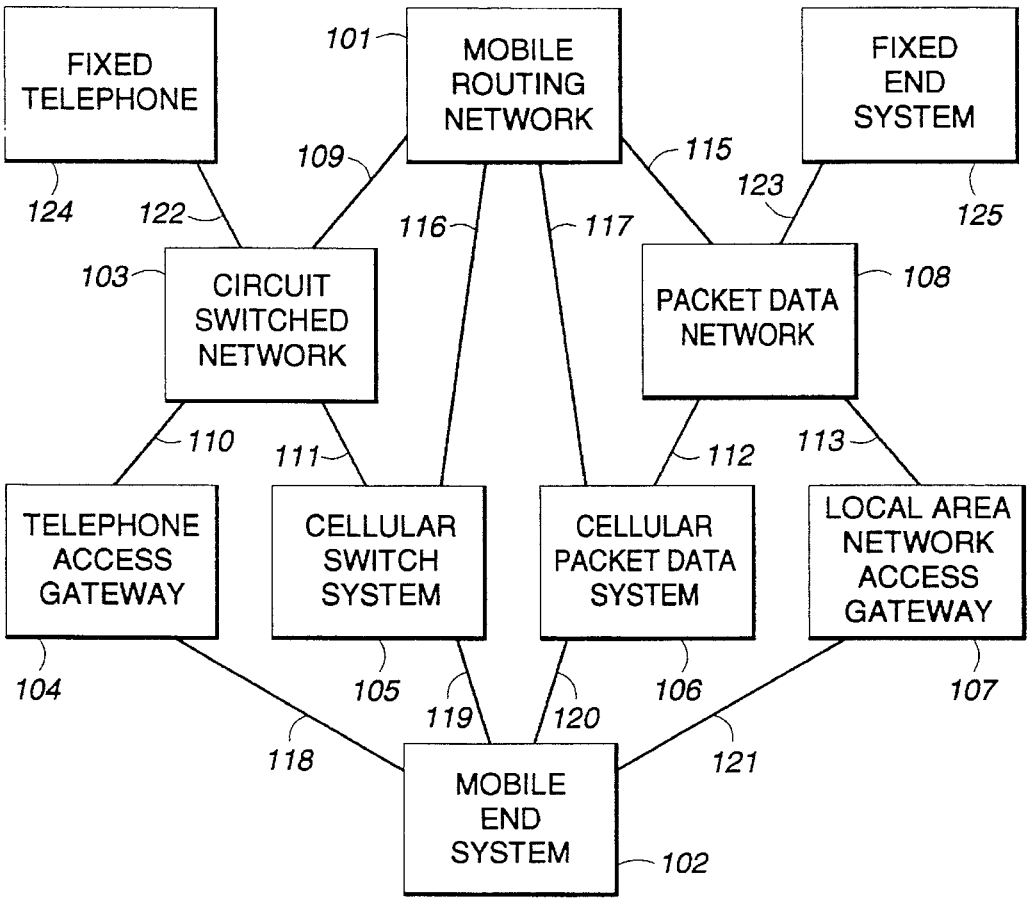
FIG. 1 is a block diagram showing the configuration of the mobile end system and other components of the present invention.

Referring first to FIG. 1, the network system of the present invention comprises four primary devices: a mobile end system 102, a telephone access gateway 104, a local area network access gateway 107, and a mobile routing network 101. Components of the system that derive substantially from prior art are a fixed telephone 124, a circuit switched network 103, a packet data network 108, a cellular packet data system 106, a cellular switch system 105, and a fixed end system 125. The network system is designed to route data packets bidirectionally between mobile end system 102 and fixed end system 125, and also between mobile end system 102 and other similar mobile end systems of similar design. The network system is also designed to connect switched circuits between mobile end system 102 and fixed telephone 124, and also between mobile end system 102 and other mobile systems of similar design.

Mobile end system 102 connects to one or more subnetwork communication devices, which as shown in FIG. 1 may include telephone access gateway 104, cellular switch system 105, cellular packet data system 106, and local area network access gateway 107, which provide communication capabilities to mobile end system 102, allowing it to communicate with circuit switched network 103 and packet data network 108.

Circuit switched network 103 may be a conventional public or private network of telephone switching equipment and interconnecting facilities that provides the means for setting up a switched circuit connection between an originating device and a terminating device, and for providing bidirectional communication between these two devices. Circuit switched network 103 connects switched circuits between its connected terminal devices, including fixed telephones, according to addressing or dialing information provided by the originating terminal. A numbering plan is established that allows circuit switches within circuit switched network 103 to route calls from the point of origination to the point of termination, according to the dialled number and the network topology.

Likewise, packet data network 108 may be a conventional public or private network of packet data switching equipment and interconnecting facilities that provides the means for sending packets of data from a source device to a destination device. The mobile networking system described here assumes that the packet data network 108 follows the TCP/IP specifications. Packet data network 108 routes data packets according to the destination address contained in each packet, and static or slowly changing routing tables that associate a destination address with a physical subnetwork. The addressing plan for a TCP/IP network is hierarchical, and inherently links destination addresses to the network topology.

A mobile routing network 101 routes packet data from packet data network 108 to mobile end system 102, and supports call establishment to mobile end system 102. Mobility is supported by allowing packet data and switched circuit calls to be routed according to the current location of mobile end system 102, rather than routing according to network topology.

One or more telephone circuits 122 connect a fixed telephone 124 to circuit switched network 103. One or more telephone circuits 111 connect circuit switched network 103 to cellular switch system 105. One or more telephone circuits 109 connect circuit switched network 103 to mobile routing network 101.

The source and destination points of packet data network 108 may be, variously, fixed end system 125, cellular packet data switch 106, local area network access gateway 107, and mobile routing network 101. One or more packet data links 115 connect mobile routing network 101 to packet data network 108. One or more packet data links 123 connect fixed end system 125 to packet data network 108. One or more packet data links 113 connect packet data network 108 to local area network access gateway 107. One or more packet data links 112 connect packet data network 108 to cellular packet data system 106.

A telephone access link 118 connects mobile end system 102 to telephone access gateways 104. Telephone access link 118 is a point to point link, and may incorporate an electrical cable, a radio link, or optical link and associated interface devices to provide bidirectional communication between telephone access gateway 104 and mobile end system 102 for signalling information required for call setup and release, and bearer services including transmission of voice, data, facsimile, and other services compatible with the telephone network.

A local area network access link 121 connects mobile end system 102 to local area network access gateway 107. Local area network access link 121 is a point to point link, and may incorporate an electrical cable, a radio link or optical link and associated interface devices as a means for providing bidirectional communication between local area network access gateway 107 and mobile end system 102.

Mobile end system 102 may be connected from time to time to one or more telephone access gateway 104, cellular switch system 105, cellular packet data system 106, and local area network access gateway 107. One or more cellular circuit radio channels 119 connect mobile end system 102 to cellular switch system 105. Cellular circuit radio channel 119 is used by cellular switch system 105 and mobile end system 102 for establishment of calls between cellular switch system 105 and mobile end system 102, including registration for transmitting the current location of mobile end system 102 to cellular switch system 105, and communication of signalling information including establishment, handoff, and disconnection of calls between cellular switch system 105 and mobile end system 102, and bearer services including voice, data, facsimile, and other services compatible with the telephone network.

One or more cellular packet radio channels 120 connect mobile end system 102 to cellular packet data system 106. Cellular packet radio channel 120 provides registration means for transmitting the current location of mobile end system 102 to cellular packet data system 106, and for transmitting packet data between cellular packet data system 106 and mobile end system 102. Use of radio channel 120 is typically shared by one or more mobile end systems 102.

Figure 8:
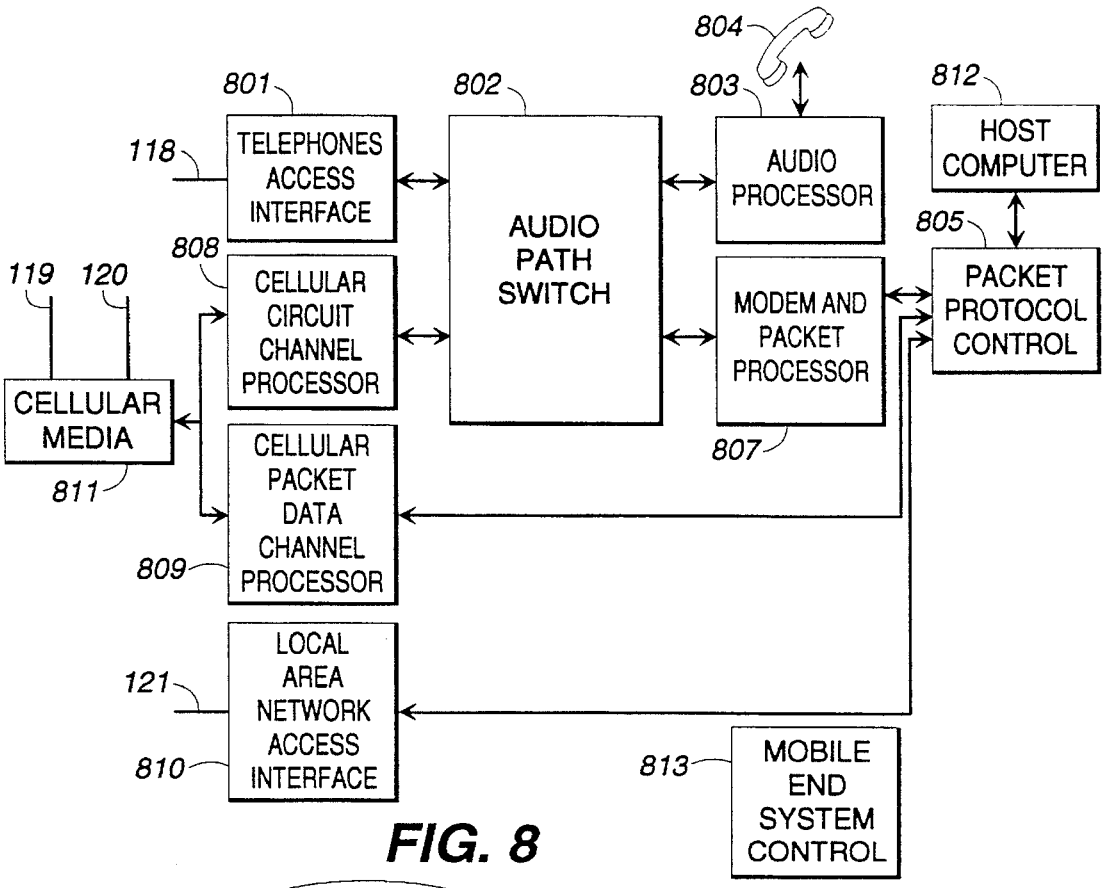
FIG. 8 is a block diagram for a mobile end system.

Mobile end system 102 may select one or more of the available means of communication, depending on its configuration, availability of the desired network service, the cost of communication services, and user requests. FIG. 8 shows a block diagram of mobile end system 102. A cellular radio 811 provides a single interface for both cellular circuit radio channel 119 and cellular packet radio channel 120. Signal processing and lower layer protocols required for the cellular interfaces are provided by a cellular circuit channel processor 808 and a cellular packet data channel processor 809. Interfaces to telephone access link 118 and local area network access link 121 are provided by a telephone access interface 801 and a local area network access interface 810, respectively. Switched circuit paths from telephone access interface 801 and cellular circuit channel processor 808 are switched by an audio path switch 802, which connects either cellular circuit channel processor 808 or cellular packet data channel processor 809 to either an audio processor 803 and its attached speaker and microphone, shown as a handset 804, or to a modem and packet processor 807. Packet flow to and from packet processor 807, telephone access interface 801, and local area network access link 121 is routed to a packet protocol control 805, which performs higher layer protocol processing, for example according to TCP/IP specifications. A host computer 812 is connected to packet protocol control 805 to control, send, and receive data. A mobile end system control 813 controls the operation of all components of mobile end system 102.

Typically, use of cellular circuit radio channel 119 and cellular packet radio channel 120 will be mutually exclusive as a consequence of shared internal radio equipment between these two communication functions and incompatibilities between simultaneous use of both. Mobile end system 102 may select one of these, or it may alternate between monitoring cellular circuit radio channel 119 and cellular packet radio channel 120. If mobile end system 102 alternates between monitoring cellular circuit radio channel 119 and cellular packet radio channel 120, the timing of this function may be synchronized with sleep procedures, as defined in the CDPD specification for cellular packet radio channels, that may be executed by cellular packet radio channel 120.

Mobile routing network 101 is responsible to determine and store the current location of mobile end system 102, for routing for data packets to mobile end system 102, and for routing switched circuit calls to mobile end system 102.

Mobile Routing Network

Figure 2:
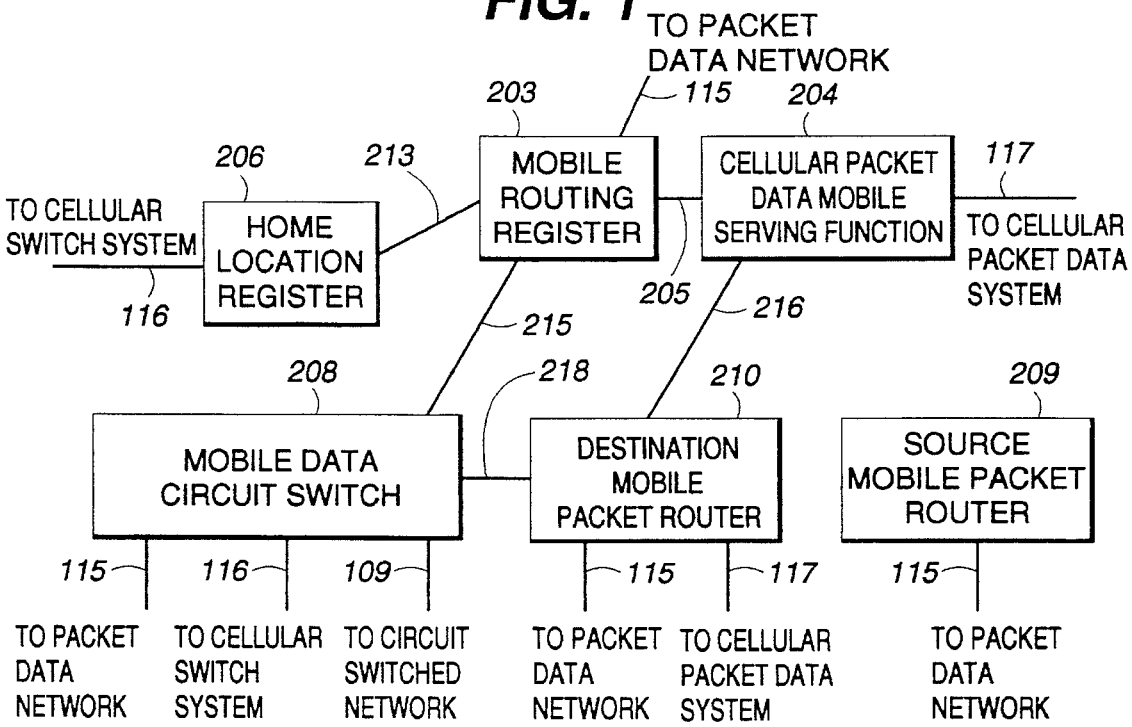
FIG. 2 is a block diagram showing the connections of the components of the mobile routing network of the present invention.

Referring to FIG. 2, mobile routing network 101 stores the current location of mobile end system 102 in a mobile routing register 203. The current location includes information required to identify the means of connection for packet data communication to the mobile end system 102, and additional information that further identifies the location of the mobile end system 102 relative to the means of connection. The specific information is dependent on the nature of the subnetwork to which mobile end system 102 connects, but will typically include mobile end system identification, subnetwork identification, subnetwork addressing such as a telephone number, additional location information such as cellular system identification or cell site identification, and bearer service capabilities presented by the subnetwork connection device, for example voice communication service. Mobile end system 102 communicates with the subnetwork connection device to determine its current location and initiate procedures for transmitting its current location through the network system to mobile routing register 203.

Mobile routing register 203 receives and stores current location information from a home location register 206 via a data link 213, a cellular packet data mobile serving function 204 via a data link 205, packet data network 108 via a packet data link 115, and a mobile data circuit switch 208 via a data link 214. By distributing routing information to selected system components, which may be geographically dispersed through mobile routing network 101, mobile routing register 203 facilitates subsequent routing of packet data. Mobile routing register 203 sends routing information to a source mobile packet router 209, a destination mobile packet router 210, and mobile data circuit switch 208 according to the current location information and network configuration information maintained by the mobile routing register.

Cellular packet data mobile serving function 204 executes the procedures required by its interface to cellular packet data system 106 for redirecting packet data from within the cellular packet data system 106 to mobile routing network 101 over a data link 205. Two procedures, defined in the CDPD specification, may be used to redirect these packets. The first procedure provides for exchange of location information between mobile routing register 203 and cellular packet data system 106. The second procedure provides for the forwarding of packets received by cellular packet data mobile serving function 204 from cellular packet data system 106 to source mobile packet router 209 over a data link 216. Packets that are forwarded in this manner are encapsulated within a forwarding IP packet header, to permit their routing by packet data network 108 according to the forwarding destination address.

Home location register 206 executes the procedures required by cellular switch system 105 to route circuit switched calls to mobile data circuit switch 208 for connection to mobile end system 102. These procedures conform to the IS-41 specifications for intersystem call delivery.

Packet data is routed by the mobile routing network 101 from source mobile packet router 209 to destination mobile packet router 210. If the packet is to delivered to mobile end system 102 via cellular switch system 105 or telephone access gateway 104, the packet will be routed from destination mobile packet router 210 to mobile data circuit switch 208. If sufficient routing information is not available at source mobile packet router 209 to forward directly to destination mobile packet router 210, other routing steps will be required, as will be shown.

Packet data is received by source mobile packet router 209 from packet data network 108 over packet data link 115 and routed according to routing information stored by source mobile packet router 209. Packet data is routed from source mobile packet router 209 to destination mobile packet router 210 by forwarding the packet data through packet data network 108. If no routing information for mobile end system 102 is available, source mobile packet router 209 will forward the packet to a second destination mobile packet router 210, where by default current routing information will be maintained. If mobile end system 102 is accessible from the recipient destination mobile packet router 210, destination mobile packet router 210 delivers the packet data to telephone access gateway 104, cellular switch system 105, cellular packet data system 106, or local area network access gateway 107, according to the routing information stored by destination mobile packet router 210. Otherwise, if the destination mobile packet router 210 is the default and mobile end system 102 is not directly accessible from this router, the routing table will identify a third destination mobile packet router 210 that can deliver to mobile end system 102, and the packet will be forwarded to this third destination mobile packet router 210.

Mobile data circuit switch 208 routes packet data between a data link 218 that connects mobile data circuit switch 208 to destination mobile packet router 210, and mobile end system 102 over a telephone circuit 109 to either telephone access gateway 104 or cellular switch system 105.

Mobile Data Circuit Switch

Figure 4:
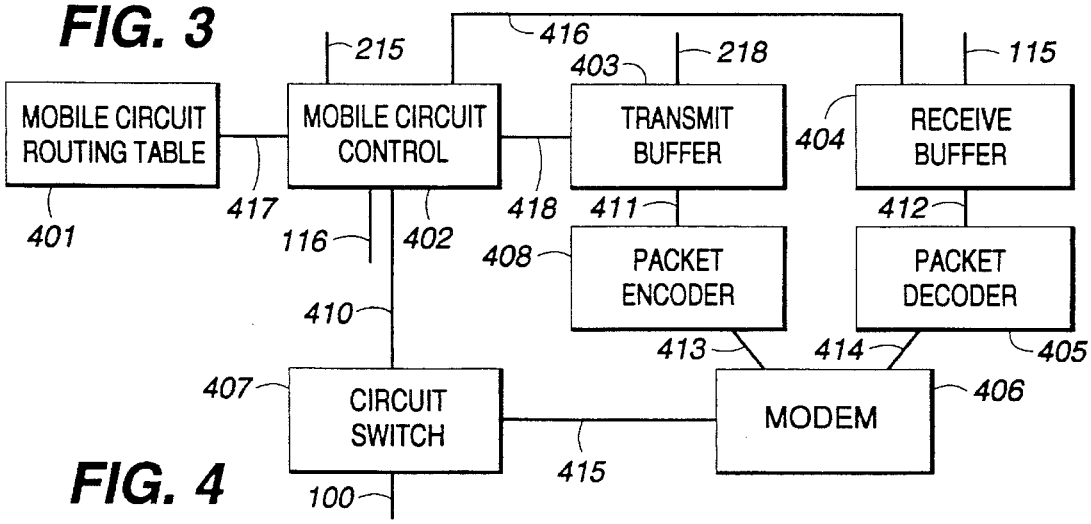
FIG. 4 is a block diagram of the mobile data circuit switch.

FIG. 4 shows the components of a mobile data circuit switch in greater detail.

A mobile circuit routing table 401 stores information about each mobile end system 102 that is accessible from mobile data circuit switch 208 via one or more telephone circuits 109 and circuit switched network 103. The information stored in mobile circuit routing table 401 may include the directory number or cellular mobile identification number for circuit switched network 103 to reach telephone access gateway 104 or cellular switch system 105 that mobile end system 102 has selected as the preferred subnetwork connection device.

A circuit switch 407 connects telephone circuit 109 to a modem 406 over a circuit 415, and connects pairs of telephone circuits 109 to each other.

Modem 406 converts data received over a data link 413 from a packet encoder 408 to an analog signal that is transmitted to circuit switch 407, and converts analog signals received from circuit switch 407 to data that is sent to a packet decoder 405 via a data link 414. Modem 406 may additionally include appropriate forward error correction, retransmission, and compression logic if desired. Many suitable modem devices with these capabilities are available, with link layer protocols such as Microcom's MNP 4, MNP 5, and MNP 10 protocols, or the CCITT V.42 or V.42bis standards.

Packet encoder 408 formats data taken from a transmit buffer 403 over a data link 411, for transmission to mobile end system 102 via modem 406 in accordance with the network layer packet protocol in use, for example the Internet SLIP or PPP protocols. Packet decoder 405 removes formatting from the data received from mobile end system 102, in accordance with the packet protocol in use.

Transmit buffer 403 stores packet data received from destination mobile packet router 210 over data link 218 until it can be transmitted to mobile end system 102, or for a maximum time. The maximum time is determined by analysis of the data content of the data in the transmit buffer. As outlined here the packet data will conform to the Internet IP protocol, and a maximum time to live is contained in these packet headers.

Receive buffer 404 stores packet data received from mobile end system 102 via packet decoder 405 and data link 412, until it can be transmitted to packet data network 108 over a packet data link 115. A maximum time to live timer may be implemented in receive buffer 404.

A mobile circuit control 402 executes procedures required for communication with mobile end system 102, such as initiating connection of switched circuits to mobile end system 102 via telephone circuit 109, answer incoming calls over telephone circuit 109, and connect modem 406 to telephone circuit 109, by exchanging messages with circuit switch 407 over a control and signalling link 410. Mobile circuit control 402 updates mobile circuit routing table 401 with information about the current switched connections to mobile end systems 102 over telephone circuits 109. Mobile circuit control 402 also updates the mobile circuit routing table 401 according to requests received from the mobile routing register 203 over data link 215.

Mobile circuit routing table 401 stores information about the routing of data from circuit switch 407 and mobile end system 102. This information will indicate the identity of connected telephone circuit 109 if a switched circuit is currently established to mobile end system 102, and will also include the directory address in circuit switched network 103 that should be used to establish a switched circuit to mobile end system 102. Temporary directory numbers may be assigned by mobile circuit control 402 and stored in mobile circuit routing table 401.

Transmitting Current Location to the Mobile Routing Register

Figure 3:
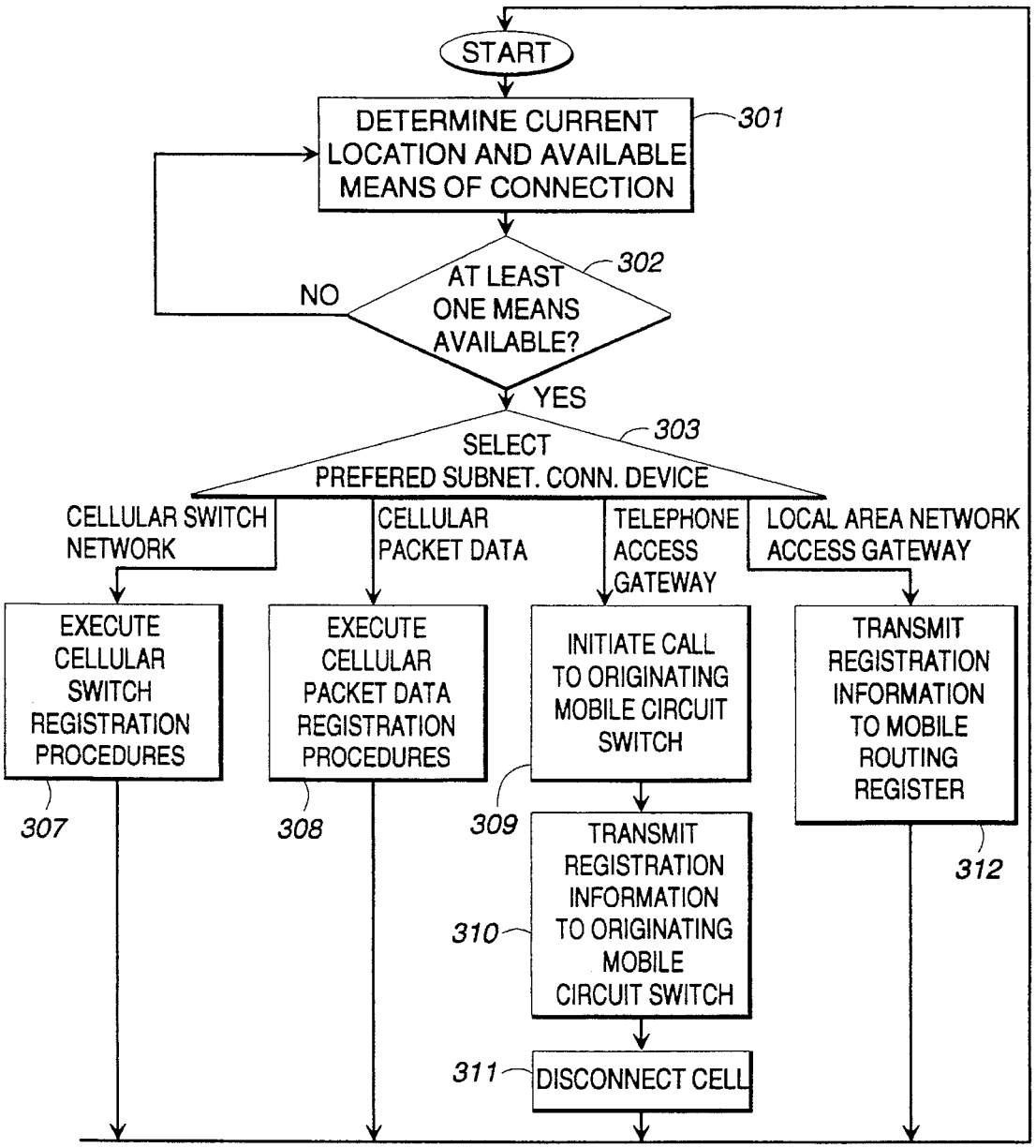
FIG. 3 is a flowchart showing the procedure executed by the mobile end station to transmit or cause to be transmitted its current location.

Referring to FIG. 3, mobile end system 102, in block 301 determines its current location and available connection means by monitoring the state of one or more configured subnetwork connection devices: telephone access link 118, cellular circuit radio channel 119, cellular packet radio channel 120, and local area network access link 121. In general, these subnetwork connection devices may incorporate stored addressing or location information, if they provide a permanent point of connection to their respective networks, or may determine a temporary address by communication with the network. In block 302, mobile end system 102 checks that at least one of these subnetwork connection devices can provide packet data service. If one or more can provide this service, mobile end system 102 selects the preferred subnetwork connection device in block 303, typically making this decision based on information about the communications needs, cost, and user preferences.

If cellular switching system 105 is selected as the preferred subnetwork connection device, then in block 307 mobile end system 102 initiates the registration procedure required by cellular switch system 105 to communicate the current location of mobile end system 102 over cellular circuit radio channel 119 to cellular switch system 105. The current location is stored by cellular switch system 105. When it complete its part of the registration procedure, cellular switch system 105 transmits the current location of mobile end system 102 to home location register 206, over cellular intersystem signalling link 116. Home location register 206 then transmits the current location of mobile end system 102 to mobile routing register 203 over data link 213. Communications over the cellular intersystem signalling link 116 follow the procedures required for interconnection to the cellular switch system 105, and typically use a standard network protocol such as X.25 or signalling system 7. Home location register 206 stores the current location of mobile end system 102 in its memory and may communicate with other cellular switch systems for the purpose of conveying cellular call routing information to these systems. The procedures followed by cellular switch system 105 and home location register 206 are defined by TIA IS-41 specifications.

If cellular packet data system 106 is selected as the preferred subnetwork connection device, then in block 308 mobile end system 102 initiates the registration procedure required by cellular packet data system 106 to communicate the current location of mobile end system 102 over cellular packet radio channel 120 to cellular packet data system 106. The current location is stored by cellular packet data system 106. Once it has completed its end of the registration procedure, cellular packet data system 106 transmits the current location of mobile end system 102 to cellular packet data mobile serving function 204, over cellular packet data system link 117. Cellular packet data mobile location register 204 then transmits the current location of mobile end system 102 to mobile routing register 203 over data link 205. These procedures conform to the requirements of the CDPD specification, for a mobile serving function.

If telephone access gateway 104 is selected by mobile end system 102 as the preferred subnetwork connection device, then in block 309 mobile end system 102 initiates a switched circuit call to mobile data circuit switch 208, through telephone access gateway 104, telephone circuits 109 and 110 and circuit switched network 103. In block 310 mobile end system 102 transmits its current location to mobile data circuit switch 208 over telephone circuit 109. Mobile end system 102 may disconnect the call after the transmitting the current location as shown in block 311, or optionally may remain connected if further communication is anticipated. Mobile data circuit switch 208 then transmits the current location of mobile end system 102 to mobile routing register 203 over data link 214. If mobile end system 102 remains connected, mobile data circuit switch 208 will update its mobile circuit routing table 401 accordingly.

If local area network access gateway 107 is selected by mobile end system 102 as the preferred subnetwork connection device, then in block 312 mobile end system 102 transmits its current location to mobile routing register 203, through local area network access gateway 107, packet data links 113 and 115 and packet data network 108.

Transmission of Routing Information

Figure 5:
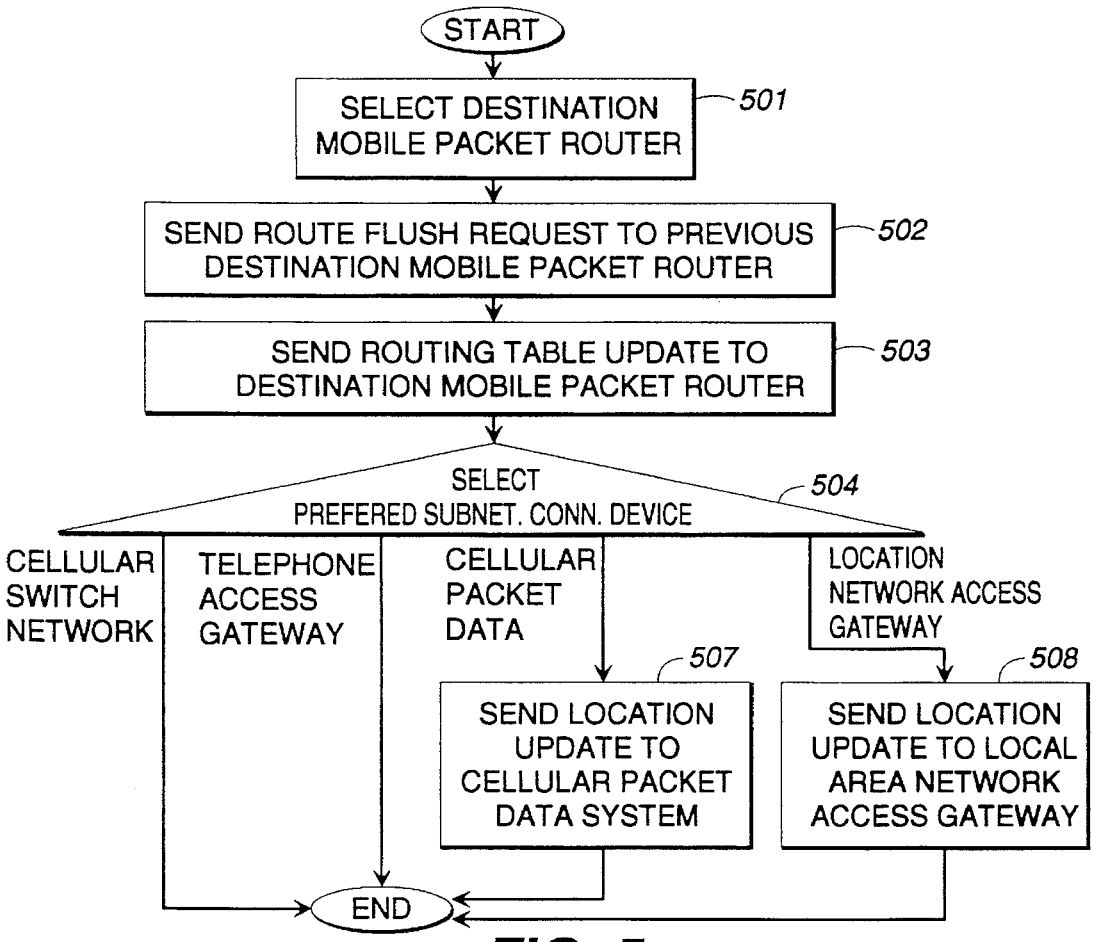
FIG. 5 is a flowchart of the procedure executed by the mobile routing register on receiving location information for a mobile end system

Mobile routing register 203, on receiving the current location of mobile end system 102 executes the procedure shown in FIG. 5. In block 501 mobile routing register 203 selects a first destination mobile packet routers 210 to route packet data to mobile end system 102 according to its current location.

Mobile routing register 203 will then, in block 502 send a route flush request to a second destination mobile packet router 210, causing this second destination mobile packet router to remove the entry for mobile end system 102 from its memory.

In block 503 mobile routing register 203 sends a request to first destination mobile packet router 210, with the information required to add an entry for mobile end system 102 to its routing tables. This table entry will identify mobile data circuit switch 208, cellular packet data system 106, or local area network access gateway 107 as the preferred subnetwork connection device for delivery of packets to mobile end system 102. Routing information is sent to mobile circuit routing table 401 if required. In block 503 mobile routing register 203 will also send a routing table update to a third destination mobile packet router 210 that is designated as the default routing point.

According to the preferred subnetwork connection device indicated by mobile end system 102 in its current location information, mobile routing register 203 may in block 504 decide to send location update information to cellular packet data system 106 in block 507, via cellular packet data mobile serving function 204, data link 205, and cellular packet data system link 117, or to send location update information to local area network access gateway 107 via packet links 113 and 115, and packet data network 108.

Routing of Data Packets and Dynamic Updating of Routing Tables

Packet data is routed from a source mobile packet router 209 to a destination mobile packet router 210 by forwarding the packet data through packet data network 108, via packet data link 115. Forwarded packets are encapsulated in a forwarding packet so that packet data network 108 can deliver the packet to the correct destination mobile packet router 210. Destination mobile packet router 210 extracts the encapsulated packet, then analyzes the destination address specified in the packet header to determine the correct routing for the packet data.

If the destination address is a subnetwork connection device that is directly accessible from destination mobile packet router 210, then destination mobile packet router 210 delivers the packet data to mobile data circuit switch 208, cellular packet data system 106, or local area network access gateway 107, according to the packet data destination address and the routing information stored in destination mobile packet router 210. If the destination address is not one of the above, then destination mobile packet router 210 will forward the packet data to the default destination mobile packet router 210, determined from the packet address for the mobile end system 102, and send a route flush request to source mobile packet router 209.

If forwarded packet data is received by a first default destination mobile packet router 210 from a source mobile packet router 209, and the previous procedure determines that the packet data is to be forwarded to a second destination mobile packet router 210, then the first destination mobile packet router 210 will send a routing table update to source mobile packet router 209, identifying the destination mobile packet router 210 that can directly route the packet data. When source mobile packet router 209 receives the table update message, it will add or modify its routing table entry for mobile end system 102.

Routing information maintained by source mobile packet router 209 and destination mobile packet router 210 may be deleted from time to time, according to internal algorithms of these devices, provided that a default destination mobile packet router 210 always maintains its routing tables such that they match the current location maintained by mobile routing register 203.

Packet Delivery over Switched Circuits

When a packet is sent from destination mobile packet router 210 to mobile data circuit switch 208 over data link 218, the packet is sent to mobile end system 102 through circuit switched network 103 and either telephone access gateway 104 or cellular switch system 105, depending on the information in mobile circuit routing table 401. When the packet arrives in transmit buffer 403, mobile circuit control 402 retrieves the table entry corresponding to the packet destination address from mobile circuit routing table 401. If there is a circuit currently established between circuit switch 407 and mobile end system 102, and this circuit is connected to modem 406, then the packet is queued in transmit buffer 403 for transmission through packet encode 408 and modem 406, to mobile end system 102. If there is a circuit currently established, and it is connected to telephone circuit 109 indicating that a voice call or other switched circuit call is in progress, the packet will be discarded. If there is no call currently in progress the procedures for connection to either telephone access gateway 104 or cellular switch system 105.

To establish a call to telephone access gateway 104, mobile circuit control 402 selects a telephone circuit 109 and commands circuit switch 407 to initiate a call to mobile end system 102, using the directory number given in mobile circuit routing table 401, corresponding to the destination address in the packet.

To establish a call to cellular switch system 105, mobile circuit control 402 sends a route request message, containing the cellular mobile identification number for mobile end system 102, to cellular switch system 105. The response to this request provides a temporary local directory number, and this number is used to establish the call to mobile end system 102. Mobile circuit control 402 selects a telephone circuit 109 and commands circuit switch 407 to initiate a call to mobile end system 102, using the temporary directory number. This procedure conforms to the requirements of the IS-41 specification for intersystem call delivery.

In either case, when the call is established, modem 406 initiates a training handshake with a modem 807 in mobile end system 102, and when this is complete packets in transmit buffer 403 are transmitted. Received packets are verified in a packet decoder 405 and placed in a receive buffer 404 for transmission over packet data link 115 to packet data network 108. As noted earlier, the time to live field in the packets stored in transmit buffer 403 and receive buffer 404 will be decremented periodically, and when they reach zero the packet will be removed from transmit buffer 403 or receive buffer 404 and discarded.

Packet Delivery to Local Area Network Access

When destination mobile packet router 210 determines that a packet is to be delivered to local area network access gateway 107, the packet is encapsulated in a packet addressed to local area network access gateway 107, which has a fixed location within the address plan used by packet data network 108. When the encapsulated packet arrives at local area network access gateway 107, the encapsulated packet is extracted and the packet is delivered to mobile end system 102 over local area access link 121.

Packet Delivery to Cellular Packet Data System

Static routing tables are sufficient to route packets to the home mobile function in cellular packet data system 106, in accordance with the requirements of the CDPD specification. Internal routing will result in encapsulated packets being forwarded to the appropriate mobile serving function, to be sent across cellular packet radio channel 120 to mobile end system 102. Note that, because of the structure of the system with the mobile routing network 102 incorporating the CDPD mobile serving function rather than a CDPD mobile home function, it is in general not required for the mobile routing network 101 to route packets for delivery to the cellular packet data system.

Circuit Switched Calls

Figure 6:
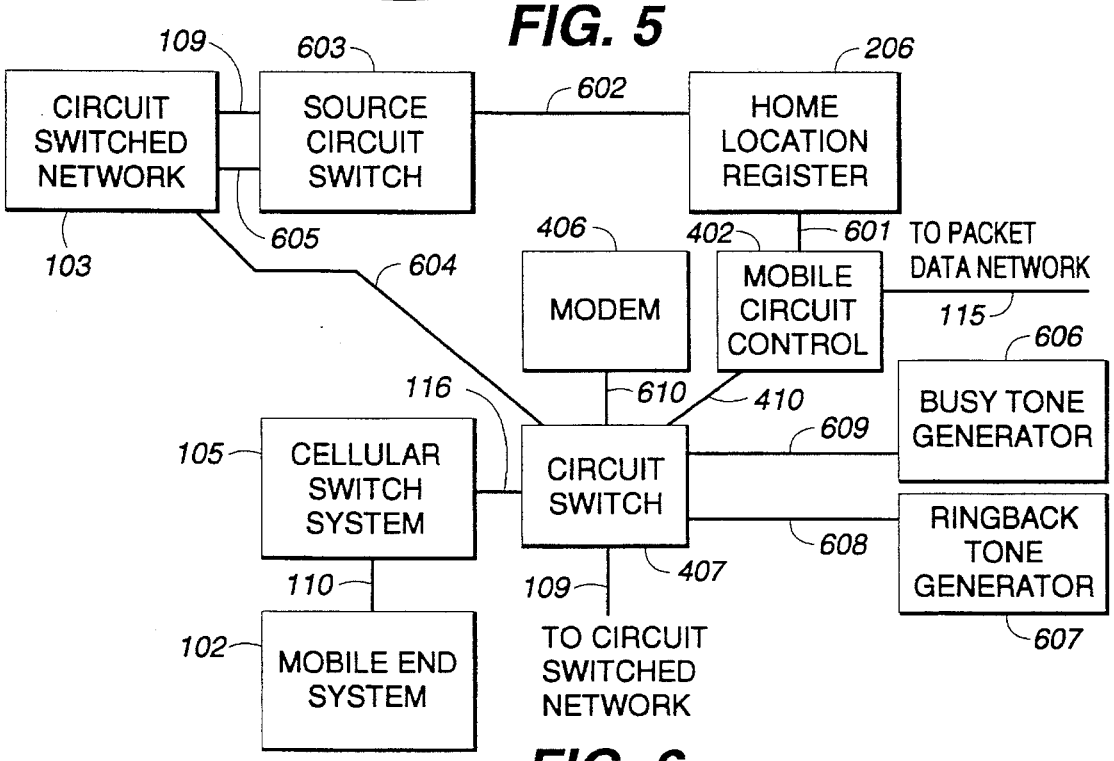
FIG. 6 is a block diagram of the system components required for connection of switched circuits and packet networks.

FIG. 6 shows those parts of the network system that participate in delivering circuit switched calls to mobile end system 102 from circuit switched network 103.

The procedures executed by source circuit switch 603 are compatible with the TIA IS-41 specification for intersystem operations. A call is originated from a fixed telephone 124 or other point in circuit switched network 103. The call is routed from circuit switched network 103 to source circuit switch 603 over a telephone circuit 109, according to the directory number provided by the originating point and the numbering plan for the network and associated with mobile end system 102. Source circuit switch 603 then sends a location request message, including the directory number for mobile end system 102, to home location register 206 over data link 602. Home location register 206 then retrieves the current location of mobile end system 102 from its memory and selects a mobile data circuit switch 208 for establishing a switched circuit to mobile end system 102. Home location register 206 may also infer special bearer service requirements from the given directory number. Specific bearer services may include voice, facsimile, and circuit data.

Home location register 206 then sends a route request message to mobile circuit control 402 in a mobile data circuit switch 208 over a data link 601, including the mobile identification, current location, and an indication of the requested bearer services. Mobile circuit control 402 will then reserve the resources required to service the call and assign a temporary local directory number. Mobile circuit control 402 sends the temporary local directory number to home location register 206 over data link 601. Home register 206 then forwards the temporary local directory number to source circuit switch 603 over data link 602.

Source circuit switch 603, on receiving the temporary local directory number, initiates a call using the temporary local directory number to route the call to circuit switch 407 through a telephone circuit 605, a circuit switched network 103, and a telephone circuit 604. Source circuit switch 603 connects a voice path between telephone circuits 109 and 605. Circuit switch 407 reports the arrival of the incoming call to mobile circuit control 402 over signalling link 410.

Figure 7:
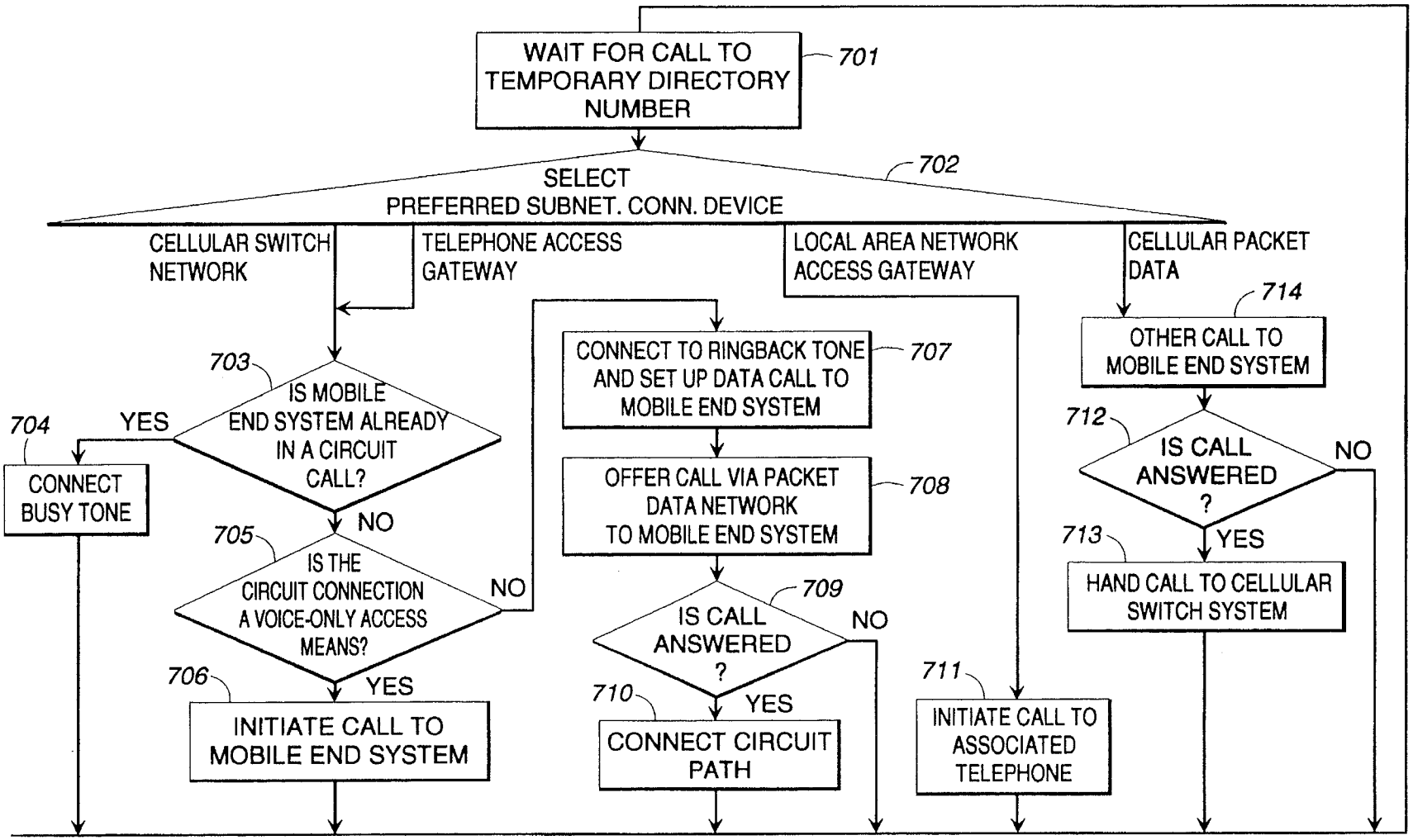
FIG. 7 is a flowchart of the procedure required for establishment of a switched circuit call to a mobile end system.

Mobile circuit control 402 then executes the procedure in FIG. 7 to route the call to mobile end system 102. Block 701 is executed according to the preferred subnetwork connection device. As shown in the flowchart the procedures for routing calls through cellular switch system 105 or telephone access gateway 104 to mobile end system 102 are similar. In these cases, block 703 is executed to determine if mobile end system 102 is currently busy, and if it is busy circuit switch 603 connects telephone circuit 604 to a busy tone generator 606 in block 704. Otherwise block 705 is executed to determine if the call path can be directly connected to the mobile end system 102. If the circuit connection is determined to support voice only bearer services, block 706 is executed to connect the call to mobile end system 102.

The method executed for block 706 differs for calls that are terminated through cellular switch system 105 and calls that are terminated through circuit switched network 103 and telephone access gateway 104. In the former case mobile circuit control 402 sends a route request message to cellular switch system 105 over cellular intersystem signalling link 116. Cellular switch system 105 replies by sending a temporary local directory number to mobile circuit control 402. Mobile circuit control 402 then initiates a call to cellular switch system 105, using the temporary local directory number to route the call through a telephone circuit 109, a circuit switched network 103, and a telephone circuit 111 to cellular switch system 105. Mobile circuit control 402 commands circuit switch 407 to connect telephone circuit 109 to telephone circuit 604.

If block 706 is executed for a call that is terminated through circuit switched network 103 and telephone access gateway 104, mobile circuit control 402 initiates a call to telephone access gateway 104, using the directory number of telephone access gateway 104, which is identified in the entry in mobile circuit routing table 401 for mobile end system 102, to route the call through a telephone circuit 109, a circuit switched network 103, and a telephone circuit 110 to telephone access gateway 104. Mobile circuit control 407 commands circuit switch 407 to connect telephone circuit 109 to telephone circuit 604.

If it was determined in block 705 that mobile end system 102 supports voice and packet data calls, mobile circuit control 402 proceeds to block 707, where mobile circuit control 402 commands circuit switch 603 to connect telephone circuit 604 to a ringback tone generator 607, and in block 707 a data call is initiated to mobile end system 102. The procedures for initiating this data call follow the procedure described above for block 706. Circuit switch 407 connects the new call to a modem 406. Data packets identifying the desired bearer services are transmitted over modem 406 to offer the call to mobile end system 102 in block 708. If the call is answered in block 709, then in block 710 mobile circuit control 402 commands circuit switch 407 to connect telephone circuit 109 to telephone circuit 604, and to provide answer supervision over telephone circuit 604.

Routing of circuit calls when the preferred subnetwork connection device is local area network access gateway 107 does not, in general allow establishment of a circuit the same communication medium as packet data communications, although high performance local area network technology will support this. In general, the current invention allows a nearby telephone, facsimile equipment, or similar facility to be identified as the terminating point for switched circuit calls, for a predetermined bearer service. If it was determined in block 702 that the preferred subnetwork connection device is local area network access gateway 107, then the call is routed in block 711 to an associated fixed telephone 124 that is identified in a system configuration database as associated with local area network access gateway 107 for the requested bearer service. The procedure executed in block 711 initiates a call through a telephone circuit 109, a circuit switched network 103, and a telephone circuit 122.

If it was determined in block 712 that the preferred subnetwork connection device is cellular packet data system 106, then in block 714 the call is offered to mobile end system 102 by sending data packets requesting the desired bearer services over packet data link 115 to cellular packet data system 106, through packet data network 108. Procedures for routing packet data to mobile end system 102 have been described in an earlier section. If the call is answered in block 712, as indicated by signalling data packets received over packet data link 115 from mobile end system 102, via cellular packet data system 106, and packet data network 108, then in block 713 the call is passed to cellular switch system 105 following the intersystem handoff procedures. Suitable handoff procedures are defined in TIA IS-41 specifications.

Mobile End System Call Handling

Figure 9:
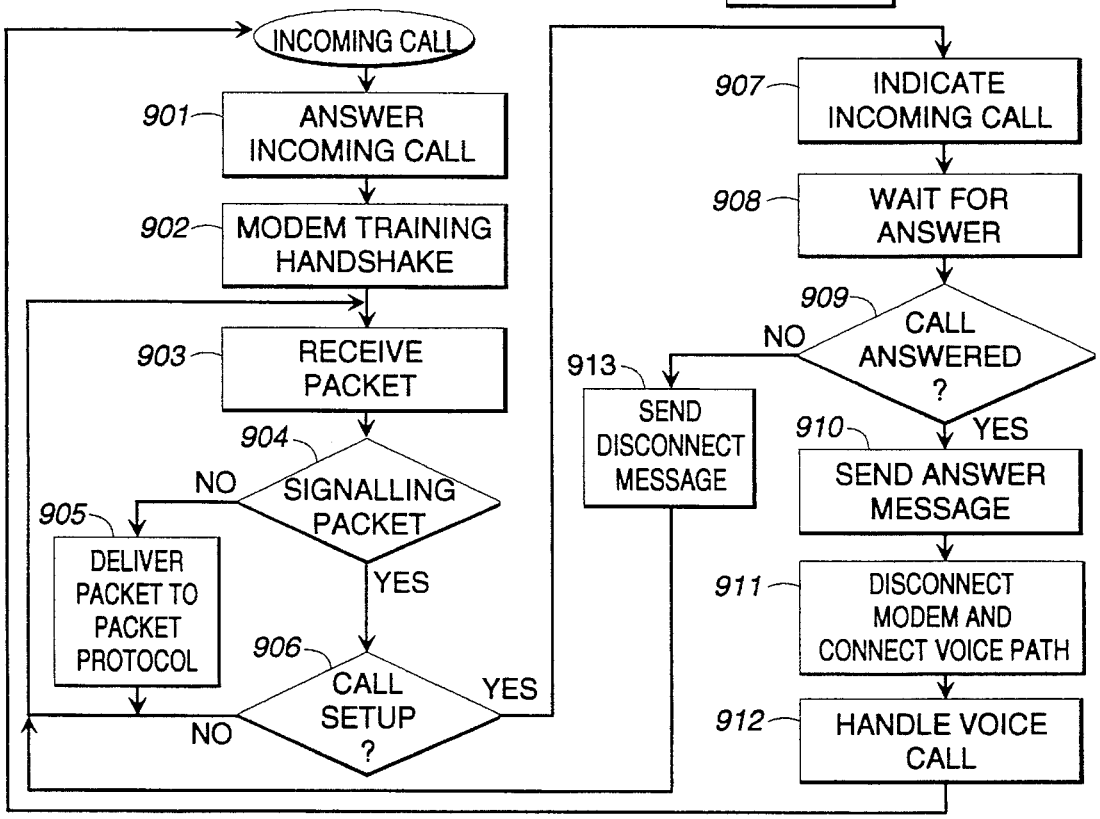
FIG. 9 is a flowchart of the procedure executed by the mobile end system for handling incoming switched circuit calls.

FIG. 9 shows a flowchart for the procedure followed by mobile end system control 813 when it receives a voice call from mobile data circuit switch 208. This procedure entails the transmission of signalling packets mixed with packet data, using the signalling packets to offer the voice call to the user. The incoming call is received, and mobile end system control 813 answers in block 901. Following the call setup procedures from TIA RS-553 for an incoming cellular call, if applicable, the mobile end system control 813 tunes a cellular radio 811 to the voice channel. In block 902 mobile end system control 813 enables a cellular channel processor 808, or telephone access interface 801, and establishes a path through an audio path switch 802 to a modem and packet processor 807, and initiates a modem training handshake for modem and packet processor 807. In block 903 a packet is received by modem and packet processor 807. Mobile end system control 813 inspects the packet in blocks 904 and 906. If it is not a signalling packet it is delivered to a packet protocol processor 805 for processing according to the Internet IP protocol specification. Call setup packets are interpreted by mobile end system control 813. In block 907 an indication of the incoming call is provided. This indication may be an audio ringing tone generated by an audio processor 803 and sounded in a handset 804, a status indication to a host computer 812, or other indication to higher level software or the user that a voice call is being offered. Mobile end system control 813 then waits in block 908 for the call to be answered by the user or host computer in block 909. It then sends an answer signalling packet from modem and packet processor 807 to the cellular circuit radio channel 119, to be subsequently communicated to mobile data switch 208, which signals answer supervision on incoming telephone circuit 604. In block 911 mobile end system control 813 disconnects the modem path through audio patch switch 802, connecting cellular circuit channel processor 808 to audio processor 803. The switched circuit is then complete, and in the case of a voice call the user can then talk and listen through handset 804. If the call is not answered by the user after a selectable time delay, or mobile end system 102 determines that it cannot accept the call at this time, for example if higher layer data communication protocols have priority for communications, a disconnect signalling message is sent to mobile data switch 208 in block 913 and packet data communication is resumed.

Variations

Design variations are possible within the system structure outlined above. Some possible variations are outlined below.

A fixed telephone 124 has been shown throughout, however many other devices can reasonably be substituted, including facsimile devices, voice mail, pagers, or switched circuit modems.

An alternate method may be used to set up switched circuit calls to a cellular switch system 105. In this method a roamer directory number is provided by cellular switch system 105 for roaming cellular mobile end systems. Call establishment proceeds by initiating a call to the roamer directory number, and cellular switch system 105 then applies dial tone. Once circuit switch 407 detects this dial tone, the cellular mobile identification number is sent from circuit switch 407 using DTMF inband signalling. This procedure is an alternative to sending a route request message and originating a call to the returned temporary directory number.

Additional routing information may be communicated from the mobile end system 102 to mobile routing register 203 as packet data, for example an alternate directory number for routing voice calls may be provided, or the bearer services available at mobile end system 102 can be restricted.

Determination by mobile end system 102 of its current location, when telephone access gateway 104 is selected as the preferred subnetwork connection device, may involve manual entry by the user of mobile end system 102, or the directory number may be determined by originating a call to circuit switch 407. Telephone caller identification features can then be used by mobile circuit control 402 to determine the originating number, which is the directory number for the point of connection of telephone access gateway 104. Mobile circuit control 402 can then forward the current location to mobile routing register 203 as previously described.

The design described above represents mobile routing network 101 as incorporating the CDPD mobile serving function, and cellular packet data system 106 as incorporating the CDPD mobile home function, where the mobile home function is the destination point for static packet routing in packet data network 108. A variation on this design would allow cellular packet data system 106 to incorporate the CDPD mobile serving function and incorporate the CDPD mobile home function in mobile routing network 101. In this variant, static routing tables in packet data network 108 would deliver packets to mobile routing network 101, where they would be routed according to the location information provided by cellular packet data system 106.

While the invention has been particularly shown as described with respect to a preferred embodiment thereof, it will be understood by those skilled in the art that changes in form and details may be made therein without departing from the scope and spirit of the invention.

I claim:

1. An apparatus for connecting a mobile end system to a communications network comprising:

a mobile end system incorporating storage means and having assigned thereto a first unique identity code;

an interface device including a first transmission means and having assigned thereto a second unique identity code, said interface device being linked to said mobile end system via a first communications channel; and data switch means including a second transmission means and having assigned thereto a third unique identity code, said data switch means being linked to said interface device via a second communications channel and being additionally linked to a communications network via a third communications channel;

wherein said mobile end system communicates with said interface device by transmitting at least said first unique identity code thereto and wherein said interface device communicates with said data switch by transmitting at least said first and second unique identity codes thereto and said data switch means communicates said third unique identity code as well as said first and second unique identity codes to said communications network.

2. The apparatus according to claim 1, wherein said communications network further comprises a telephone switch connectable to said mobile end system via said interface device.

3. The apparatus according to claim 2, wherein said second unique identity code of said interface device comprises a telephone number, and said first transmission means comprises the establishment of a telephone call from said interface device to a third transmission means attached to said telephone switch.

4. The apparatus according to claim 3, wherein said telephone switch transmits said second unique identity code to said third transmission means, which in turn transmits said telephone number to said data switch means.

5. The apparatus according to claim 4, wherein said communications network further comprises a packet data network linked to said mobile end system through said interface device, and wherein said packet data network is assigned a unique identity means which comprises an address within said packet data network.

6. The apparatus according to claim 5 wherein said interface device includes an associated storage means for storing said second unique identity code.

7. The apparatus according to claim 1 wherein the communications network is either a fixed end system or a mobile end system.

8. The apparatus according to claim 1 wherein the location of the mobile end system is stored within a mobile routing register.

9. The apparatus according to claim 8 wherein said location comprises information to identify connection means for packet data communication.

10. The apparatus according to claim 9 wherein said connection means comprises means for routing the data packets.

11. The apparatus according to claim 1, wherein said data switch means and said mobile end system comprise a modem and wherein said switching transmission means comprise setting up a switched circuit from said data switch to said interface device, for transmission of the data packets from said data switching modem to said mobile end system modem.

12. The apparatus according to claim 1, wherein said communications network comprises a cellular packet data network, a cellular telephone switch and telephone circuits.

13. The apparatus according to claim 1 wherein a cellular intersystem roaming protocol is used for identification of routing to be used for packet routing wherein a cellular telephone is to transmit a predetermined unique identification code to a cellular telephone switch which is to transmit said identification code to said data switch.

14. The apparatus according to claim 13, wherein a cellular telephone switch, which comprises connection means for connecting radio channels to said telephone circuits, and said mobile end system communicate by means of switched circuit radio channel, and wherein said data packet comprises commands to said mobile end system to switch to said switched circuit radio channel.

15. The apparatus according to claim 14, wherein interface means comprises a cellular packet data radio or a packet radio channel, which transmits a predetermined unique identification code to said cellular packet data system which in turn transmits said identification code to the data switch.

16. The apparatus according to claim 1, wherein said communications network comprises a circuit switch connected to a switched telephone network, linking it to said data switch, via one or more telephone circuits, which comprise signalling means for establishing switched circuits.

17. The apparatus according to claim 16, wherein said circuit switch sends data packets to said data switch for establishing a switched circuit between said interface device, comprising said switched circuit communication means and said circuit switch.

18. The apparatus according to claim 16, wherein said circuit switch forwards incoming calls to a directory number according to the identity of said interface device.

19. A method of communicating data packets bidirectionally between a mobile end system and either a fixed end system or a second mobile end system, said mobile end system being coupled to one or more subnetwork communication devices to communicate with a circuit switched network or packet data network, said method comprising the steps of:

assigning unique identity codes at least one mobile end system, an interface device and a data switch means;

setting up communication channels between an originating device and a terminating device, one of which is said mobile end system;

identifying a routing scheme to be used for packet transmission; and establishing bidirectional communications between said originating device and said terminating device.

20. The method according to claim 19, wherein said bidirectional communications between said originating device and said terminating device is via either a packet data network or a circuit switched network.

21. The method according to claim 19, wherein said mobile end system is coupled to one or more subnetwork communication devices, and said mobile end system determines its location and available connection means by monitoring said subnetwork connection devices.

22. The method according to claim 19, wherein a mobile routing register sends a route flush request.

23. The method according to claim 19, wherein call setup packets are interpreted by a mobile end system control in order to establish a path through an audio path switch to a modem and packet processor.

* * * * *